United States Patent Office 3,849,543
Patented Nov. 19, 1974

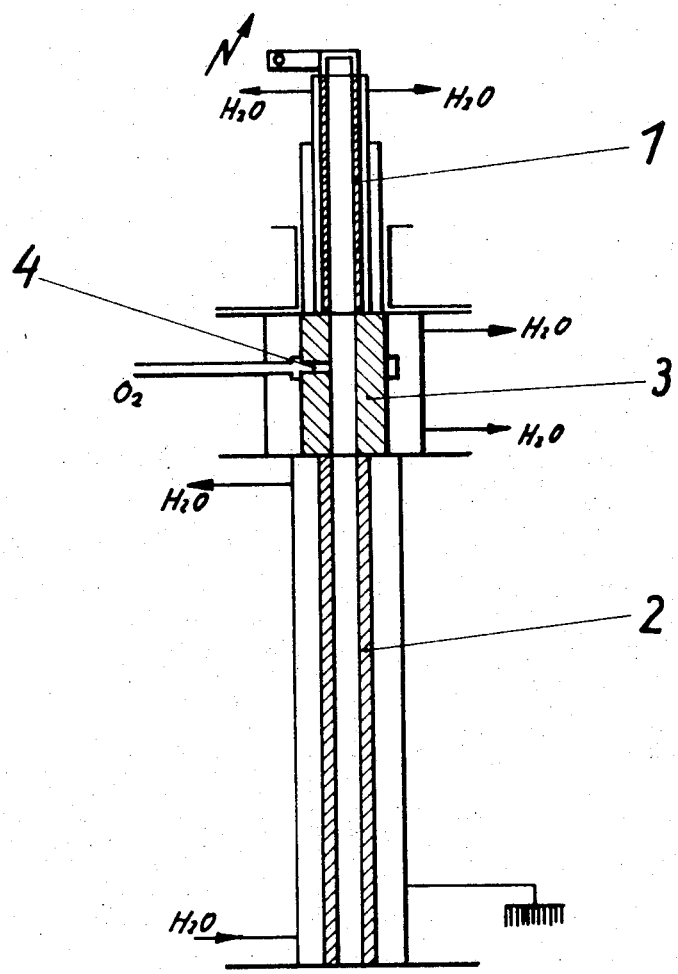

3,849,543
MAKING METAL OXIDES WITH OXYGEN-CONTAINING GAS PRE-HEATED OVER Pd-Au-Ag-ALLOY ELECTRODE
Hans Zirngibl, Duisburg, Werner Fuhr and Klemens Jaschinski, Krefeld-Uerdingen, Peter Beumer, Krefeld, and Walter Weidmann, Duisburg-Mundelheim, Germany, assignors to Bayer Aktiengesellschaft
Filed May 11, 1971, Ser. No. 142,125
Claims priority, application Germany, May 27, 1970, P 20 25 897.3
Int. Cl. C01g 1/02, 23/04
U.S. Cl. 423—592
7 Claims

ABSTRACT OF THE DISCLOSURE

An electrode material for electric arcs suitable for heating oxygen or gas mixtures containing oxygen for inorganic gas-phase reactions such as the reaction of readily volatile halides with oxygen to form the corresponding finely divided oxides with pigment or filler properties, comprising a Pd-Au-Ag-alloy containing from about 10 to 65% by weight of palladium, about 20 to 65% by weight of gold and about 15 to 50% by weight of silver. The electrode may be in the form of a hollow cylinder plated on its inside with the alloy. Alternatively, it may be a composite with carbon or graphite.

In a preferred method of use, an electric arc is established across two such hollow electrodes and oxygen is supplied to the arc established across said electrodes. The preheated oxygen is removed through one of the electrodes, cooled on its outside, and the oxygen is then reacted with a metal halide vapor such as titanium tetrachloride to form the corresponding oxide. Because the electrode wears only minimally, the ultimate oxide is substantially free of electrode material so that it is uncolored thereby.

---

The present invention relates to a novel electrode material, an electric arc burner including such material, and its use in preparing uncontaminated metal oxides from metal halide vapors.

In some inorganic gas-phase reactions which are of industrial interest, such as in particular the reaction of readily volatile halides with oxygen to form the corresponding finely divided oxides suitable for use as pigments or fillers, one or both reactants have to be continuously preheated to a temperature above 1000° K. to enable the reactions to proceed under control on account of serious inhibiting influences thereon.

Oxygen or gaseous mixtures containing oxygen of the kind used in the aforementioned reactions can only be heated to temperatures of at most 800° C. in heat exchangers made of metal. Ceramic heat exchangers are prone to breakage, difficult to seal and are not very efficient. In many cases, the often described method of heating the oxygen by mixing it with the hot gaseous end products of a highly exothermic chemical reaction is unsuitable on account of the dilution and danger of contamination involved.

Since on the other hand it is also difficult to heat the readily volatile halides on account of their highly corrosive effect on metals at temperatures above 500° C. and on most ceramic materials at temperatures above 800 to 1000° C., it has recently been proposed to use an electric discharge for heating.

The electric discharge can take place in an inert gas. The inert gas is heated to a very high temperature and its energy can be transferred by admixture with the gas to be heated (oxygen and/or the volatile halide). In the present context, inert gases include nitrogen, argon, helium, neon and the like. One disadvantage of this process is that the reaction gases are diluted by the superheated inert gas with the result that inter alia the pigment properties of the oxides formed may be adversely affected. Another disadvantage is that the inert gas has a troublesome effect during further processing of the halogen, e.g. chlorine, formed during the reaction.

On the other hand the electric discharge can also be carried out directly in the oxygen or oxygen-containing gas. Induction plasma burners and high-intensity plasma burners are preferably used for heating the gases in this way. In the induction plasma burner, the gas flows in a spiral through a quartz-tube surrounded by a cooled copper coil. High frequency alternating currents flowing through the copper coil generate a field which heats the pre-ionized gas. In the high-intensity burner, the gas flows axially or spirally through an arc which burns between a rod-like, tungsten cathode and a co-axial cylindrical copper nozzle. Unfortunately, both burners have serious disadvantages which prevent them from being used on an industrial scale.

The high-frequency plasma burner has a low efficiency level which is normally below 50% especially because of the high energy losses during generation of the high frequency. Furthermore, the high-frequency generators are expensive and limited in output.

The high-intensity plasma burner also has high energy losses which are attributable to the intensive cooling of the electrodes and which usually amount to between 40 and 60%. Another disadvantage is the limited durability of the electrodes especially in cases where oxygen or an oxygen-containing gas is used as the burner gas.

Burnup of the electrodes in arc burners contaminates the end product in the production of white pigments such as titanium dioxide. The metal vapors or metal oxides entrained by the plasma jet discolor the pigment. For this reason, it has been proposed to use as electrode materials only those metals and compounds which yield non-discoloring oxides such as Al, Ti, Zr, SiC and carbon. However, this measure does not reduce electrode burnup; on the contrary it is actually increased on account of the limited stability of these electrode materials under the effect of oxygen. The electrodes have to be replaced or alternatively readjusted after a short time. In the latter case, however, cooling involves considerable difficulties.

It is also known that oxygen or oxygen/inert gas mixtures can be heated by an arc or by high-voltage discharge using a special electrode material, in which case the electrodes used have a considerably lengthened useful life. This electrode material is said to have a thermal conductivity as measured at 20° C. of greater than 0 33 cal./cm.s.° C., and metal oxides formed from this material are said to be no longer stable at temperatures above 500° C. The noble metals, silver and gold, and their alloys and composite materials of these metal or metal alloys with carbon or graphite are mentioned as particularly suitable electrode materials.

One of the disadvantages of this process, especially in cases where it is intended to use the heated oxygen for reaction with TiCl$_4$ in the production of TiO$_2$ for use as pigment, is that the white pigment is contaminated by the erosion of the electrode material. It is known that discoloring impurities can have a marked effect upon the pigment properties of TiO$_2$ even in cases where they are present in quantities of only a few p.p.m.

It is accordingly an object of the invention to provide an electrode material which will not erode to such an extent as to discolor materials passed through its arc, or derivatives made therefrom.

It is a further object to provide an electrode material of high efficiency and high life.

These and other objects and advantages are realized in accordance with the present invention pursuant to which there has been found an electrode material for electric arcs for heating oxygen or gas mixtures containing oxygen for inorganic gas-phase reactions, and especially for the reaction of readily volatile halides with oxygen to form the corresponding finely divided oxides with pigment or filler properties. The novel electrode material comprises a palladium-gold-silver-alloy containing from about 10 to 65% by weight of palladium, from about 20 to 65% by weight of gold and from about 15 to 50% by weight of silver.

It is preferred to use alloys with a palladium-gold-silver-ratio of about 3:3:4 respectively, i.e. alloys containing about 30% by weight of palladium, about 30% by weight of gold and about 40% by weight of silver.

In certain cases, the alloy may also contain up to about 5% by weight of one or more of the metals zinc, cadmium, magnesium, tin, copper, germanium, indium, manganese, iron, cobalt, nickel and of the metals of the platinum series such as for example platinum, osmium, rhodium or iridium.

In cases where the electrodes are used in the form of tubes, the alloy can be used either as a pure material or applied as a plating to silver. In addition, the alloy can also be used in the form of a composite material with carbon or graphite. To produce this composite material, a porous carbon or graphite matrix may either be impregnated with the liquid alloy, or alternatively the constituents in powder-form can be converted into a molding which is subsequently sintered at an elevated temperature.

Of the numerous possible types of arc, it is preferred to use the so-called vortex-stabilized arc whose resistance is brought to a value in the range of from about 0.5 to 50 ohms by tangentially blowing the gas to be heated on to it and which has a working voltage above about 500 v. and preferably above about 800 v. The advantage of this arc is embodied on the one hand in its greater efficiency during the heating of gases which would normally amount to between about 75 and 90%, and on the other hand in the relatively low current density at the electrodes, thus reducing the thermal stressing thereof.

In addition, the focal spots of the arc on the electrodes can be rapidly displaced by tangential blowing which also lengthens the service life of the electrodes.

It is also possible by influencing the arc with a magnetic field generated by a coil situated outside the arc to increase the resistance of the arc and also rapidly to displace the focal spots of the arc on the electrodes.

For this reason, this measure is also preferably applied in conjunction with the use of the electrode material according to the invention.

In addition to tangential delivery of the gas to be heated to the arc, the gas to be heated can also be made to flow in either axially or radially. Combinations of the various methods of delivery are also applicable. For example, some of the working gas can be introduced through the tangential feed-pipes and the rest through an axial feed-pipe into the burner.

BN, $Si_3N_4$, quartz, quartz glass and porcelain have proved to be suitable materials for producing the insulators. These materials retain their outstanding insulating properties even at elevated temperatures.

The electrodes are best externally cooled with water in which case the rate of flow of the cooling water through the cooling ducts and/or through the cooling jackets of the electrodes should amount to between about 2 and 40 meters per second in order to ensure the rapid dissipation of heat from the focal spot of the arc.

The energy losses of the burner can be calculated by measuring the inlet and outlet temperature and also the throughput of cooling water.

The invention will be further described with reference to the accompanying drawing wherein the figure is a schematic longitudinal sectional view through an electric arc burner for heating gas.

Referring now more particularly to the drawing, the arc burner comprises two hollow electrodes 1 and 2 which are arranged above one another on a common axis and which are electrically insulated from one another by an insulator 3. The insulator 3 is provided with tangential bores 4 through which the gas to be heated is introduced into the cylindrical interior. The arc which is struck by short-circuiting the electrodes with an auxiliary electrode, a metal wire, a carbon filament or with a downwardly flowing salt solution, burns primarily in the longitudinal axis of the burner. Inside the two hollow electrodes, the arc curves downwards to the surface of the electrodes and terminates in a focal spot which moves in circles on the surface of the electrode. The hot gas leaves the burner at the lower open end of the electrode 2. Each of the electrodes is surrounded by a jacket through which cooling water is circulated, as shown. Each of the two electrodes can also be concentrically surrounded by a coil (not shown), which generates an axially extending magnetic field.

In addition to forming the oxide of titanium from its halide the foregoing process may be similarly used to prepare oxides of iron, aluminum, silicon, zirconium, magnesium, chromium, tin and zinc and the like from their corresponding halides as described in U.S. Pats. 3,481,703; 3,486,913; 3,525,595 and 3,532,462 whose disclosures are incorporated herein by reference.

The process according to the invention is illustrated by the following Examples:

Example 1

35 Nm.³ of oxygen per hour were blown through a bore 4 in a burner of the kind shown in the figure equipped with electrodes of 30% of Pd, 30% of Au and 40% of Ag-pure material. Where the burner was operated with a direct current of 40 a., the voltage was adjusted to a value of 1100 v. The burner had an output of 44 kw. The heat dissipated in the cooling water amounted to 6700 Kcal./hr. Thus, the efficiency of the burner amounted to 82.3%. The issuing gas had an enthalpy of an average 20 Kcal./mol corresponding to an average temperature of 2640° K. The burner was operated for 60 hours under the same conditions. After this time, the electrodes were examined. Both the electrodes showed limited roughening over an approximately 30 mm. long zone of their inner surface. Elsewhere the inner surface was completely smooth. Neither of the electrodes showed localized burn marks or pores. Over the 60 hours operating period, the anode tube showed an overall weight loss of 0.95 g. The cathode tube was not found to have undergone a weighable loss of weight. The enthalpy of the heated oxygen is sufficient to give a mixing temperature of around 1000° C. during admixture with approximately 22 Nm.³ of $TiCl_4$ preheated to substantially 450° C. The oxide-yielding reaction takes place at this temperature, and approximately 79 kg./h. of of $TiO_2$-pigment are obtained. The sum total of contamination from Pd/Au/Ag amounted to substantially 0.2 p.p.m. in the $TiO_2$-pigment. This quantity is harmless and does not produce any change in color.

Example 2

The procedure was as described in Example 1 except that instead of the tube of pure material as anode, a silver anode was used which was lined internally with the Pd-Au-Ag-alloy. The plating was 0.3 mm. thick. After an operating period of 60 hours for an oxygen throughput of 35 Nm.³/hr. and a burner output of 44 kw. (40 a. and 1100 v.), the extent of erosion of the anode tube was measured at 0.90 g.

Example 3

The procedure was as described in Example 1 except that a composite material of 30% of Pd-Au-Ag-alloy and 70% of graphite was used as the anode tube. The oxygen throughput again amounted to 35 Nm.³/hr. and the burner output to 42.8 kw. (40 a. and 1070 v.). The burner had an efficiency of 84.1%. After an operating period of 60 hours, a weight loss of 1.40 g. was measured. The output of the burner was sufficient to produce 79 kg./hr. of $TiO_2$-pigment. The extent to which the $TiO_2$-pigment was contaminated by Pd, Au, and Ag amounted to 0.1 p.p.m. This small quantity did not in any way impair the properties of the pigment.

Example 4 (comparison Example)

The procedure was as described in Example 1 except that silver was used for the anode tube. The oxygen throughput amounted to 35 Nm.³/hr. and the burner output to 38 kw. (40 a. and 950 v.). The heat dissipated in the cooling water amounted to 7300 Kcal./h. Accordingly, the burner had an efficiency of 77.6%. After an operating period of 60 hours, a weight loss of 15.4 g. was measured. On completion of the test, the anode tube was cut open lengthwise. It could now be seen that a flat crater which had a maximum depth of 0.7 mm. and which extended along the tube over a length of 50 mm. had been formed in the inner tube. The output of the burner was sufficient to produce 64 kg./h. of $TiO_2$-pigment during the reaction with $TiCl_4$ preheated to approximately 450° C. The $TiO_2$-pigment produced contained approximately 4 p.p.m. of Ag. This impurity was sufficient to turn the pigment slightly gray in color.

It will be appreciated that the instant specification and examples are set forth by way of illustration and not limitation and that various modifications and changes may be made without departing from the spirit and scope of the present invention.

What is claimed is:

1. In the production of a metal oxide including the steps of pre-heating an oxygen-containing gas, and then mixing said gas with the vapor of a metal halide to produce said metal oxide, the improvement which comprises pre-heating said oxygen-containing gas by passage through an electric arc established across two electrodes at least the anode of which is an electrode material comprising a Pd-Au-Ag-alloy containing from about 10 to 65% by weight of palladium, about 20 to 65% by weight of gold and about 15 to 50% by weight of silver, whereby there is essentially no weight loss of the electrode and no contamination of the metal oxide by the electrode.

2. The process according to claim 1, wherein the palladium, gold and silver are present in a ratio by weight of about 3:3:4.

3. The process according to claim 1, wherein the palladium-gold-silver-alloy is plated onto a silver base.

4. The process according to claim 3 wherein the electrode is of annular cylindrical configuration with the plating at least on the inside.

5. The process according to claim 1, wherein both electrodes are of the same composition and the palladium, gold and silver are present in a ratio by weight of about 3:3:4.

6. The process according to claim 2, wherein the palladium-gold-silver-alloy is plated onto a silver base.

7. The process according to claim 6, wherein the electrode is of annular cylindrical configuration with the plating at least on the inside.

References Cited

UNITED STATES PATENTS

| | | | |
|---|---|---|---|
| 3,553,527 | 1/1971 | Gutsche et al. | 23—202 V |
| 3,558,274 | 1/1971 | Holden | 23—202 V |
| 3,695,840 | 10/1972 | Pfender | 423—613 |

OTHER REFERENCES

Hackh's Chemical Dictionary, 4th ed. revised, 1969, by Julius Grant, p. 485, McGraw-Hill Book Co., New York.

EDWARD STERN, Primary Examiner

U.S. Cl. X.R.

423—635, 659, 579, 606, 608, 613, 618, 622, 625, 633; 204—164; 29—199; 75—165; 13—18